United States Patent
Hillenbrand et al.

(10) Patent No.: US 10,236,542 B2
(45) Date of Patent: Mar. 19, 2019

(54) METHOD FOR THE SWITCHING OF A NUMBER OF BATTERY CELLS IN A BATTERY AND BATTERY SYSTEM WITH A BATTERY COMPRISING A NUMBER OF BATTERY CELL UNITS, EACH COMPRISED OF A BATTERY CELL AND A BATTERY CELL MONITORING MODULE ASSOCIATED WITH SAID BATTERY CELL

(71) Applicant: Robert Bosch GmbH, Stuttgart (DE)

(72) Inventors: Philipp Hillenbrand, Neuffen (DE); Philipp Hartmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 14/872,221

(22) Filed: Oct. 1, 2015

(65) Prior Publication Data

US 2016/0099488 A1 Apr. 7, 2016

(30) Foreign Application Priority Data

Oct. 2, 2014 (DE) .................. 10 2014 220 062

(51) Int. Cl.
*H01M 10/44* (2006.01)
*H01M 10/48* (2006.01)
*H01M 10/42* (2006.01)

(52) U.S. Cl.
CPC ..... *H01M 10/482* (2013.01); *H01M 10/4257* (2013.01); *H01M 2010/4271* (2013.01); *H01M 2220/20* (2013.01)

(58) Field of Classification Search
CPC ........ H02J 7/0013; H02J 7/0009; H02J 7/355; H02J 7/0042

USPC .................. 320/112, 116, 117, 118, 119, 120
See application file for complete search history.

(56) References Cited

U.S. PATENT DOCUMENTS

| 5,656,915 | A | * | 8/1997 | Eaves | ................. H01M 10/482 320/118 |
| 2012/0153961 | A1 | * | 6/2012 | Kobayashi | ........... G01R 31/362 324/434 |
| 2012/0274283 | A1 | | 11/2012 | van Lammeren | |

(Continued)

FOREIGN PATENT DOCUMENTS

| DE | 102011002548 A1 | 7/2012 |
| DE | 102013201489 A1 | 8/2014 |
| DE | 102013202280 A1 | 8/2014 |

*Primary Examiner* — Edward Tso
(74) *Attorney, Agent, or Firm* — Michael Best & Friedrich LLP

(57) ABSTRACT

A method for the switching of a number of battery cells in a battery which is configured as an electrochemical storage device, wherein each of the battery cells is electrically connected to the battery in accordance with a corresponding first probability $P1i$, and is electrically disconnected from the battery in accordance with a corresponding second probability $P2i$, and wherein the battery cells are mutually connectable in series. According to the method, a performance factor $Gi$ is calculated for each battery cell as a sum of a function, which, specifically, is linearly dependent upon a state of charge $LZi$ of the corresponding battery cell, and a second function which, specifically, is linearly dependent upon a product of a current value of a current which flows in the corresponding battery cell when the corresponding battery cell is electrically connected to the battery and the internal resistance of the corresponding battery cell.

8 Claims, 3 Drawing Sheets

(56) References Cited

U.S. PATENT DOCUMENTS

2013/0099746 A1 4/2013 Nork et al.
2014/0015488 A1 1/2014 Despesse

* cited by examiner

METHOD FOR THE SWITCHING OF A NUMBER OF BATTERY CELLS IN A BATTERY AND BATTERY SYSTEM WITH A BATTERY COMPRISING A NUMBER OF BATTERY CELL UNITS, EACH COMPRISED OF A BATTERY CELL AND A BATTERY CELL MONITORING MODULE ASSOCIATED WITH SAID BATTERY CELL

BACKGROUND OF THE INVENTION

The present invention relates to a method for the switching of a number of battery cells in a battery which is configured as an electrochemical storage device. The invention also relates to a battery system with a battery configured as an electrochemical storage device, comprising a number of battery cell units, each comprised of a battery cell and a battery cell monitoring module associated with the battery cell.

FIG. 1 shows a battery system 10 which is known from the prior art, comprising a battery 11 with a number of battery cell units (Smart Cell Units SCU) 20, each comprised of a battery cell 21 and a battery cell monitoring module (battery cell electronic module or battery cell electronics) 22 associated with said battery cell 21. In the interests of simplicity, only two battery cell units are represented in FIG. 1, each of which is designated by the reference number 20. The battery cell monitoring modules 22 permit the individual control of the individual battery cells 21. For the generation of an output voltage (total output voltage) U from the battery 11, which also serves as the output voltage U of the battery system 10, the battery cell monitoring modules 22 are mutually interconnected in series by means of a connecting link. The battery system 10 also comprises a central control unit (CCU) 30 for the control of the battery system 10.

For the generation of a controlled output voltage (total output voltage) U from the battery 11, individual battery cells 21 are brought in-circuit by means of their associated battery cell monitoring module 22, i.e. the battery cells 21 are connected either with a positive or a negative polarity relative to the tap-off of the output voltage U in the series circuit. For the generation of a controlled output voltage (total output voltage) U from the battery 11, individual battery cells 21 are also disconnected by means of their associated battery cell monitoring module 22, i.e. the battery cells 21 to be disconnected are isolated from the series circuit, whereby the connecting terminals of each battery cell 21 to be disconnected by means of the associated battery cell monitoring module 22 are electrically connected, such that the corresponding battery cells 21 are bridged. Consequently, the battery cells 21 connected on the series circuit may each be in a circuit state which is designated as "positively connected" or in a further circuit state which is designated as "negatively connected". In addition, the battery cells 21 which are isolated from the series circuit are in a circuit state which is designated as "bridged".

In battery systems 10 of this type (smart cell battery systems), decisions concerning the switchover of the circuit state of the battery cells 21 proceed on a decentralized basis in the respective battery cell monitoring modules 22. Actual control functions are implemented by the central control unit 30, which is configured as a central controller of limited complexity.

To this end, in the battery system 10, a setting for a first control variable P1 and a second control variable P2 is delivered via a communication link 31 which is configured as a unidirectional communication interface via which, from the central control unit 30, only a single message incorporating the current control variables P1 and P2 is transmitted to all the battery cell monitoring modules 22. All the battery cell monitoring modules 22 receive the same message, and either connect their associated battery cells 21 independently to the series circuit, or effect the bridging of their associated battery cells 21 by means of the corresponding switches (not represented) in each battery cell monitoring module 22. In accordance with a control algorithm, the central control unit 30 generates the two control variables P1, P2 in the form of two numerical values which lie between 0 and 1, which are transmitted via the communication link 31 from the central control unit (CCU) 30 to the battery cell monitoring modules (SCU) 22 and received uniformly by all the battery cell monitoring modules 22. The following relationship applies: $0 \leq P1 \leq 1$ and $0 \leq P2 \leq 1$.

In each battery cell monitoring module 22, a uniformly-distributed random process is executed, whereby P1 is interpreted as a first probability to the effect that each disconnected battery cell 21 will be connected, designated as a connection probability, and P2 is interpreted as a second probability to the effect that each connected battery cell 21 will be disconnected, designated as a disconnection probability. The central control unit 30 regulates the control variables P1 and P2 such that the difference (control margin) between a current output voltage U and a desired output voltage Us of the battery system 10 is as small as possible.

In addition, for the generation of a controlled output voltage U from the battery 11, a simple extension of the control algorithm executed by the central control unit 30 may be implemented such that active battery cell function state balancing (battery cell balancing) is achieved by the simultaneous application of a weighted service life for the battery cells 21.

For the generation of a controlled output voltage U from the battery, each battery cell monitoring module 22 scales the relevant control variable P1 or P2, i.e. the identically received control variable P1 or P2, selected in accordance with the circuit state of the associated battery cell 21, is subject to the application of a performance factor, which is calculated with reference to a state of charge (SOC) and a state of health (SOH) of the associated battery cell 21. As a result, for the generation of a controlled output voltage U from the battery during a discharging process, disconnected battery cells 21 with a higher performance factor have a higher probability of being connected than battery cells 21 with a lower (inferior) performance factor and, conversely, battery cells 21 with a lower performance factor have a higher probability of being disconnected than battery cells 21 with a higher performance factor. For the generation of a controlled output voltage U from the battery, as an average over time, battery cells 21 with a lower performance factor are discharged less frequently, thereby permitting the achievement of an active battery cell function state balancing function for the battery cells 21.

SUMMARY OF THE INVENTION

According to the invention, a method is proposed for the switching of a number of battery cells in a battery which is configured as an electrochemical storage device. Each of the battery cells is electrically connected to the battery in accordance with a corresponding first probability, and is electrically disconnected from the battery in accordance with a corresponding second probability. The battery cells are also mutually connectable in series. According to the method, a performance factor is calculated for each battery cell as a sum of a first function, which, specifically, is linearly dependent upon a state of charge of the corresponding battery cell, and a second function which, specifically, is linearly dependent upon a product of a current value of a current which flows in the corresponding battery cell when the latter is electrically connected to the battery and the internal resistance of the corresponding battery cell. In addition, for each battery cell, the corresponding first probability and the corresponding second probability are determined in each case in accordance with the calculated performance factor for the corresponding battery cell.

According to the invention, a battery system is also proposed with a battery configured as an electrochemical storage device, comprising a number of battery cell units, each comprised of a battery cell and a battery cell monitoring module associated with said battery cell. Each battery cell monitoring module is configured to complete the electrical connection of its associated battery cell to the battery with a corresponding first probability, and to complete the electrical disconnection thereof from the battery with a corresponding second probability. The battery cells are also mutually connectable in series, by means of their associated battery cell monitoring modules. Each battery cell monitoring module is also configured to calculate a performance factor for its associated battery cell, as a sum of a first function, which, specifically, is linearly dependent upon a state of charge of the associated battery cell, and a second function which, specifically, is linearly dependent upon a product of a current value of a current which flows in the associated battery cell when the latter is electrically connected to the battery and the internal resistance of the associated battery cell. In addition, each battery cell monitoring module is configured to determine, for the associated battery cell, the corresponding first probability and the corresponding second probability in each case, in accordance with the calculated performance factor for the associated battery cell.

For the purposes of the invention, the current value of a current is understood as the positively defined magnitude of the corresponding current.

The sub-claims describe preferred further developments of the invention.

In a specifically preferred form of embodiment of the invention, the first probability for each battery cell during the discharging of the battery is a uniformly rising and specifically linear, and during the charging of the battery a uniformly falling and specifically linear function of the performance factor of the corresponding battery cell and/or the second probability for each battery cell during the discharging of the battery is a uniformly falling and specifically linear, and during the charging of the battery a uniformly rising and specifically linear function of the performance factor of the corresponding battery cell. Preferably, the first function in the expression of the performance factor for each battery cell, during both the discharging of the battery and the charging of the battery, is a uniformly rising and specifically linear function of the state of charge of the corresponding battery cell and/or the second function in the expression of the performance factor for each battery cell, during the discharging of the battery, is a uniformly falling and specifically linear and, during the charging of the battery, a uniformly rising and specifically linear function of the product of the current value of the current flowing in the corresponding battery cell, when the latter is connected to the battery, and the internal resistance of the corresponding battery cell.

According to the invention, each battery cell which is electrically uncoupled from the battery, i.e. each disconnected battery cell, can be electrically coupled, i.e. connected, to the battery with a first probability which, during the discharging of the battery, is a uniformly rising and specifically linear and, during the charging of the battery, a uniformly falling and specifically linear function of the performance factor of the corresponding battery cell. This means that, during the discharging of the battery, the higher the performance factor of a disconnected battery cell, the more frequently this battery cell will be connected and, conversely, the lower the performance factor of a disconnected battery cell, the less frequently this battery cell will be connected. This also means that, during the charging of the battery, the higher the performance factor of a disconnected battery cell, the less frequently this battery cell will be connected and, conversely, the lower the performance factor of a disconnected battery cell, the more frequently this battery cell will be connected. In addition, each connected battery cell may be disconnected with a second probability which, during the discharging of the battery, is a uniformly falling and specifically linear and, during the charging of the battery, a uniformly rising and specifically linear function of the performance factor of the corresponding battery cell. This means that, during the discharging of the battery, the higher the performance factor of a connected battery cell, the less frequently this battery cell will be disconnected and, conversely, the lower the performance factor of a connected battery cell, the more frequently this battery cell will be disconnected. This also means that, during the charging of the battery, the higher the performance factor of a connected battery cell, the more frequently this battery cell will be disconnected and, conversely, the lower the performance factor of a connected battery cell, the less frequently this battery cell will be disconnected. Overall, a battery cell with a higher performance factor is more intensively discharged than a battery cell with a lower performance factor.

According to the invention, for each battery cell, by means of its associated battery cell monitoring module, it is also possible to calculate a performance factor as a sum of a first uniformly rising and specifically linear function, both during the discharging of the battery and the charging of the battery, of a state of charge of the corresponding battery cell and a second uniformly falling and specifically linear, during the discharging of the battery, and uniformly rising and specifically linear, during the charging of the battery, function of the product of the current value of the current flowing in the corresponding battery cell, when the latter is connected, and the internal resistance of the corresponding battery cell. As the same current flows in battery cells which are interconnected in series, and the internal resistance of each battery cell is proportional to the state of health of the corresponding battery cell, it follows that each battery cell which shows a higher state of charge than at least one further battery cell, but with the same internal resistance or the same state of health, will be brought on-load more frequently, during the discharging of the battery, and less frequently, during the charging of the battery, than the at least one further battery cell. Conversely, each battery cell which shows a lower state of charge than at least one further battery cell, but with the same internal resistance or the same state of health, will be brought on-load less frequently, during the discharging of the battery, and more frequently, during the charging of the battery, than the at least one further battery cell. Consequently, each battery cell which, in relation to at least one further battery cell, shows an equal state of charge but a higher internal resistance, or a more advanced state of aging, during both the discharging of the battery and the charging of the battery, will be brought on-load less frequently than the at least one further battery cell. Conversely, each battery cell which, in relation to at least one further battery cell, shows an equal state of charge but a lower internal resistance, or a less advanced state of aging, during both the discharging of the battery and the charging of the battery, will be brought on-load more frequently than the at least one further battery cell. As high currents accelerate the aging of each battery cell, and battery cells in a more advanced state of aging show an increased internal resistance, the invention permits the achievement of the uniform aging of battery cells which are connected according to the invention.

To summarize, according to the invention, for each battery cell of a battery in a battery system according to the invention, a performance factor is applied which is calculated respectively according to the state of charge and the state of health of the corresponding battery cell such that, by means of each performance factor, the function state of the corresponding battery cell is determined. Accordingly, on the basis of the performance factors, calculated according to the invention, for the battery cells of a battery in a battery system according to the invention, it is possible to execute active battery cell function state balancing, by means of which the balancing of battery cells of different self-discharge ratings and different chemical capacities, and the uniform aging of the battery cell, are achieved simultaneously. This means that battery cells with lower self-discharge ratings and higher chemical capacities are discharged and charged more frequently than battery cells with higher self-discharge ratings and lower chemical capacities and, conversely, battery cells with higher self-discharge ratings and lower chemical capacities will be discharged and charged less frequently than battery cells with lower self-discharge ratings and higher chemical capacities. At the same time, the loading of superior battery cells is such that the latter will age more rapidly than inferior battery cells and, conversely, the loading of inferior battery cells is such that the latter will age less rapidly than superior battery cells.

In a particularly advantageous form of embodiment of the invention, for the calculation of the performance factor of each battery cell, the state of charge of the corresponding battery cell, a first voltage which is present on the corresponding battery cell when the latter is connected to the battery, and a second voltage which is present on the corresponding battery cell when the latter is disconnected from the battery are measured. In addition, a value is determined for a difference between the corresponding first voltage and the corresponding second voltage, which is identical to the product of the current value of the current, which flows in the corresponding battery cell when the latter is connected to the battery, and the internal resistance of the corresponding battery cell.

Preferably, the performance factor Gi of each battery cell is calculated, during the discharging of the battery, by the expression shown in equation (1) below and, during the charging of the battery, by the further expression shown in equation (2) below, in which i is a natural number between 1 and n, where n represents the number of battery cells in a battery system in a battery according to the invention, $LZ_i$ is the state of charge of the corresponding $i^{th}$ battery cell, $U1_i$ is the first voltage, which is present on the corresponding $i^{th}$ battery cell when the latter is disconnected from the battery, $U2_i$ is the second voltage, which is present on the corresponding $i^{th}$ battery cell when the latter is connected to the battery, and U0 is a positive scaling variable, for example of 0.25 V, which is specifically selected such that the inequality $|(U1_i-U2_i)|/|U0| \leq 1$ will be valid. To this end, k1 and k2 are two appropriately selected positive constants for the calculation of the performance factor Gi of the corresponding $i^{th}$ battery cell:

$$Gi = k1 \cdot LZ_i + k2 \cdot (1-(|(U1_i-U2_i)|/|U0|)); k1+k2=1 \quad (1)$$

$$Gi = k1 \cdot LZ_i + k2 \cdot ((|(U1_i-U2_i)|/|U0|)); k1+k2=1 \quad (2)$$

Preferably, in equations 1 and 2, the expression $|(U1_i-U2_i)|/|U0|$ is replaced by a constant with a value of 1 where, with the selected scaling constant U0, the further inequality $|(U1_i-U2_i)|/|U0|>1$ is valid.

Consequently, the performance factor of each battery cell can be calculated in a very straightforward manner by means of its associated battery cell monitoring module.

Preferably, for each battery cell, a first control variable scaled by the application of a first factor and a second control variable scaled by the application of a second factor are applied correspondingly as the first probability and the second probability respectively. The first control variable and the second control variable respectively are independent of the performance factor of the corresponding battery cell. In addition, the first factor and the second factor respectively are predefined in accordance with the performance factor of the corresponding battery cell.

Preferably, the same first control variable and the same second control variable are applied for all the battery cells.

In a specifically preferred form of embodiment of the invention, for the generation of a desired output voltage from the battery, the first control variable and the second control variable are stipulated. Preferably, a current output voltage of the battery is measured and is compared with the desired output voltage of the battery. In addition, in the event of a difference between the current output voltage and the desired output voltage, the first control variable and the second control variable are adjusted such that the magnitude of the difference between the current output voltage and the desired output voltage is minimized. For this purpose, it is preferred that the measured current output voltage and the desired output voltage should not be instantaneous values of the corresponding voltages, but should be average values of the corresponding voltages over a number of control cycles, or statistical mean values for the corresponding voltages.

The battery cells in a battery of a battery system according to the invention are preferably lithium-ion battery cells.

A further aspect of the invention relates to a vehicle with a battery system according to the invention.

BRIEF DESCRIPTION OF THE DRAWINGS

Examples of embodiment of the invention are described in detail below, with reference to the accompanying diagrams. The same components are represented by the same reference numbers. In the diagrams.

DETAILED DESCRIPTION

Figure 1:
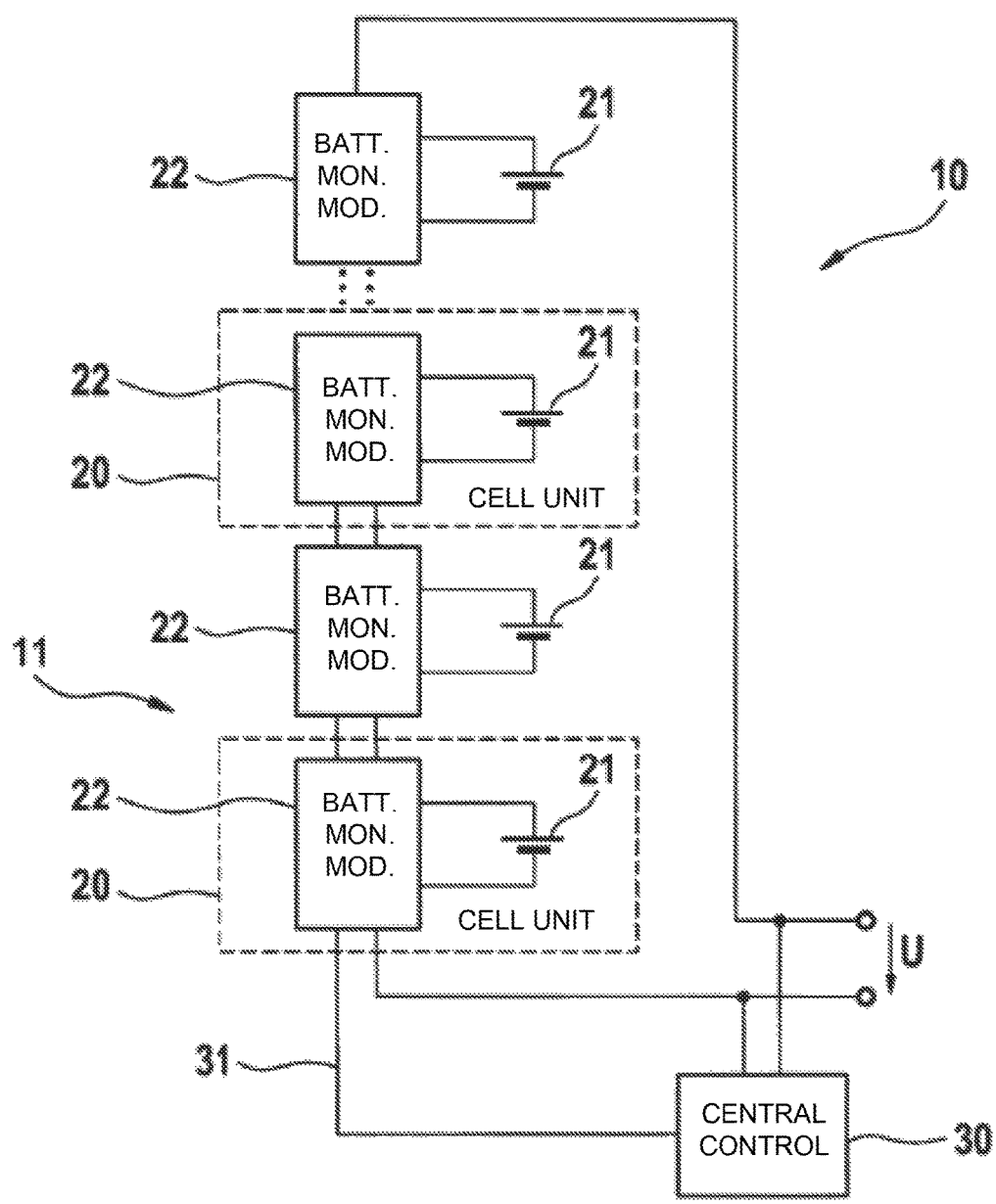
FIG. 1 shows a battery system which is known from the prior art.
Figure 2:
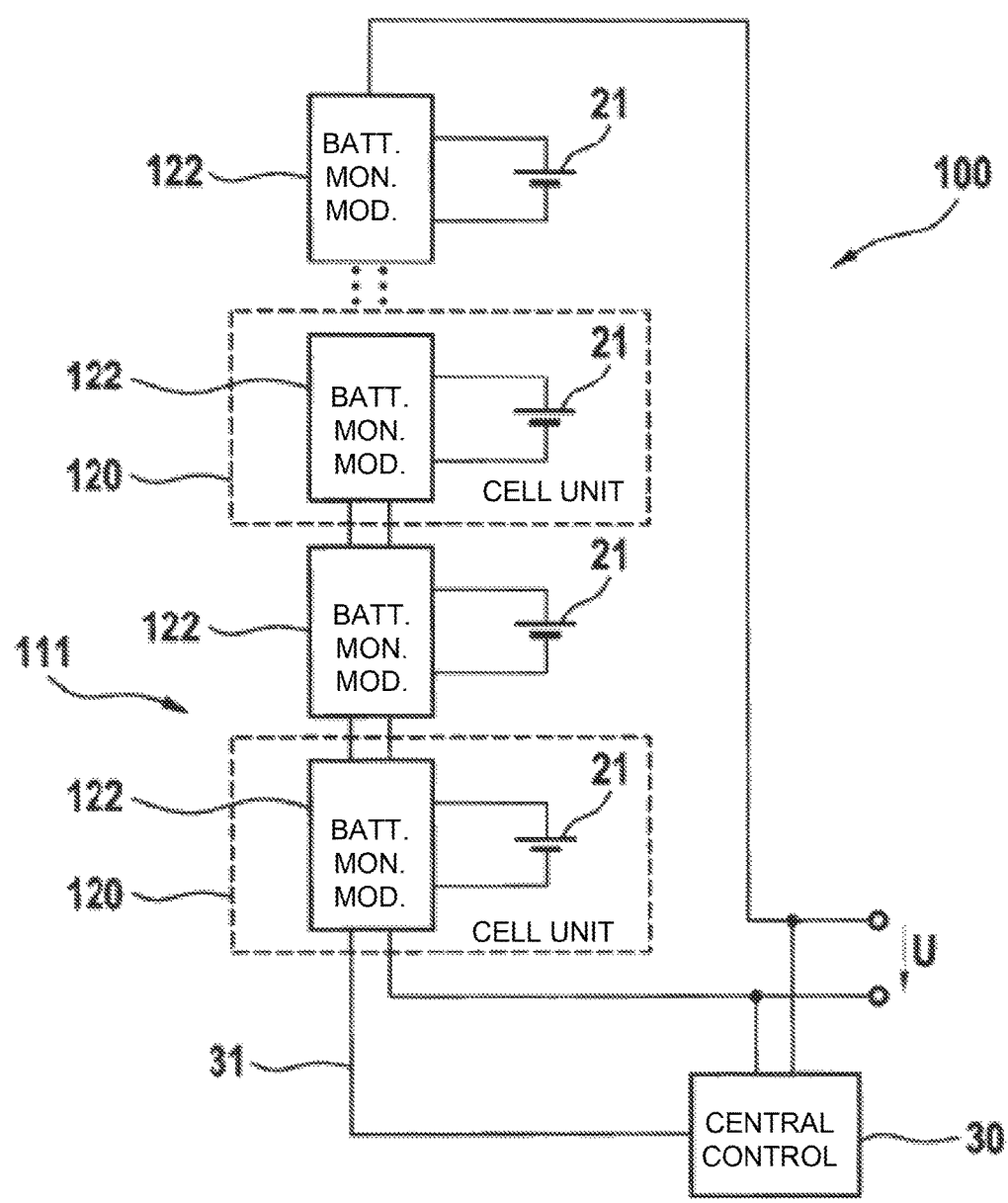
FIG. 2 shows a battery system according to a first form of embodiment of the invention.

FIG. 2 shows a battery system 100 according to the invention, in accordance with a first form of embodiment of the invention. In common with the battery system represented in FIG. 1, which is known from the prior art, the battery system 100 according to the invention comprises a battery 111 which is configured as an electrochemical storage device, with a number of battery cell units 120, each comprising a battery cell 21 and a battery cell monitoring module 122 associated with said battery cell 21. In the battery system 100 according to the invention, each battery cell monitoring module 122 is also configured, in respect of its associated battery cell 21, to complete the connection, i.e. the electrical coupling thereof to the battery 111, and to complete the disconnection, i.e. the electrical uncoupling thereof from the battery 111, with a corresponding first probability $P1i$ and with a corresponding second probability $P2i$ respectively. The battery cell units 122 of the battery system 100 according to the invention are also configured such that, when the corresponding battery cells 21 are connected, the latter are mutually connected in series, i.e. the connected battery cells 21 can also be incorporated into a series circuit with a positive or negative polarity respectively here.

The battery system 100 according to the invention differs from the battery system represented in FIG. 1 in respect of the functionality of the battery cell monitoring modules 122 associated with the battery cells 21. The battery cell monitoring modules 122 according to the invention are designed to determine the performance factors Gi of the associated battery cells 21 applied for the scaling of the control variables P1 and P2, dictated by the central control unit 30, and consequently also the corresponding first probabilities $P1i$ and the corresponding second probabilities $P2i$, by a different method from the battery cell monitoring modules of the battery system represented in FIG. 1. As a result, more effective function state balancing of the battery cells 21 is achieved. The functionality of each battery cell monitoring module 122 according to the invention is described in greater detail below.

Figure 3:
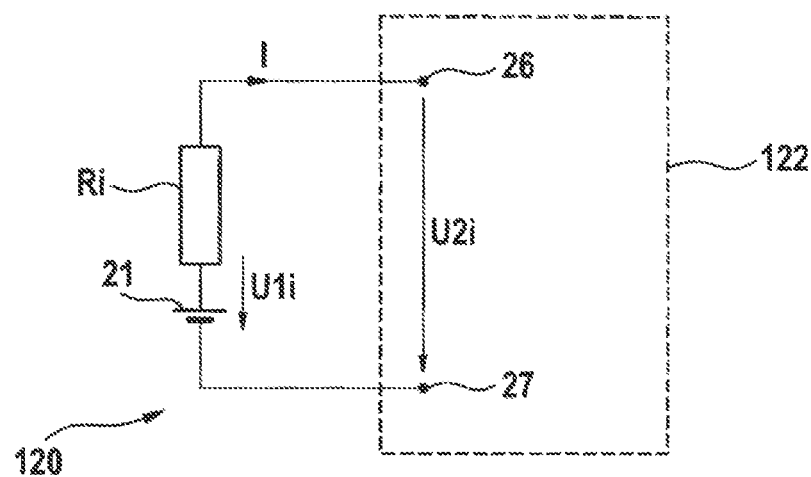
FIG. 3 shows an equivalent circuit diagram of a battery cell unit for application in a battery of the battery system configured in accordance with the first form of embodiment of the invention, the associated battery cell of which is connected and discharging.
Figure 4:
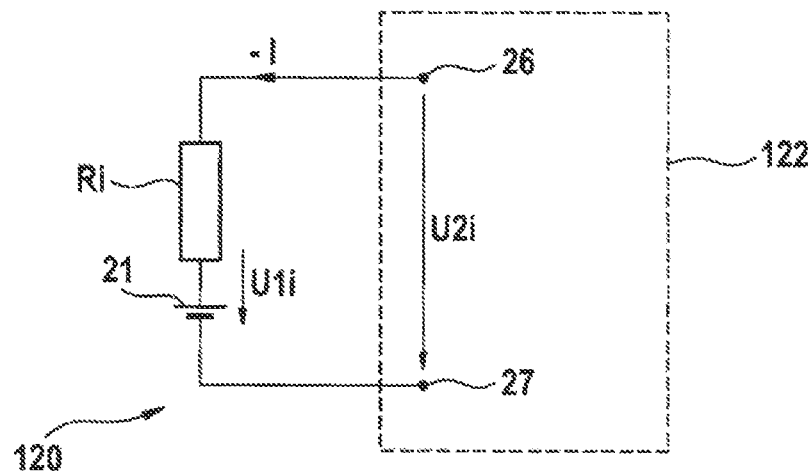
FIG. 4 shows an equivalent circuit diagram of a further battery cell unit for application in the battery of the battery system configured in accordance with the first form of embodiment of the invention, the associated battery cell of which is connected and charging.

To this end, FIG. 3 shows an equivalent circuit diagram of a battery cell unit 120 for application in the battery 111 of the battery system 100 configured according to the first form of embodiment of the invention, the battery cell 21 of which is electrically connected to the battery cells 111 via its two battery cell terminals 26, 27, and is discharged by means of a discharge current I. In addition, FIG. 4 shows an equivalent circuit diagram of a further battery cell unit 120 for application in the battery 111 of the battery system 100 configured according to the first form of embodiment of the invention, the battery cell 21 of which is electrically connected to the battery 111 via its two battery cell terminals 26, 27, and is charged by means of a charging current –I. Given that, in the battery system 100 according to the invention, all the connected battery cells 21 are mutually connected in series, the same current I,–I flows in all the connected battery cells. In FIGS. 3 and 4, each of the battery cell monitoring modules 122 associated with the battery cells 21 is also represented. As each battery cell unit 120 present in the battery 111 is of the same design, the variables applied, by means of which the function state of the battery cells 21 of the battery cell units 120 represented in FIGS. 3 and 4 is determined, are represented hereinafter by the same index i, which is a natural number between 1 and the number of battery cell units 120 present in the battery 111, designated as n.

Unlike the battery cell monitoring modules of the battery system represented in FIG. 1, each battery cell monitoring module 122 according to the invention is designed to measure a state of charge LZi of the associated battery cell 21, a first voltage $U1i$ which is present on the associated battery cell 21 when the latter is connected, and a second voltage $U2i$ which is present on the associated battery cell 21 when the latter is disconnected. The internal resistance of the battery cells 21 in the battery cell units 120 represented in FIGS. 3 and 4 is designated as Ri.

For the battery cell 21 of the battery cell unit 120 represented in FIG. 3, discharged by the discharge current I, equation (3) applies:

$$U2i = U1i - I \cdot Ri \quad (3)$$

For the battery cell 21 of the battery cell unit 120 represented in FIG. 4, charged by the charging current –I, equation (4) applies:

$$U2i = U1i - (-I \cdot Ri) \quad (4)$$

In equation (4), it has been considered that the charging current –I is negative.

According to equations (3) and (4), for each connected battery cell 21, the magnitude of the difference between the corresponding first voltage $U1i$ and the corresponding second voltage $U2i$ is equal to the product of the current value I of the discharge current I or the charging current –I flowing in the corresponding battery cell 21 and the internal resistance Ri of the corresponding battery cell 21. For this purpose, the current value I of a current I,–I is understood as the positively defined magnitude |I|,|–I| of the corresponding current I,–I. These equalities are represented in equations 5 and 6:

$$|(U1i - U2i)| = |I| \cdot Ri \quad (5)$$

$$|(U1i - U2i)| = |-I| \cdot Ri \quad (6)$$

Each battery cell monitoring module 122 according to the invention is designed, during the discharging of the battery 111, to calculate a performance factor Gi for the associated battery cell 21, in accordance with equation (1), introduced previously in the general description:

$$Gi = k1 \cdot LZi + k2 \cdot (1 - (|(U1i - U2i)|/|U0|)); k1 + k2 = 1 \quad (1)$$

Moreover, each battery cell monitoring module 122 according to the invention is designed, during the charging of the battery 111, to calculate a performance factor Gi for the associated battery cell 21, in accordance with equation (2), introduced previously in the general description:

$$Gi = k1 \cdot LZi + k2 \cdot ((|(U1i - U2i)|/|U0|)); k1 + k2 = 1 \quad (2)$$

In equations 1 and 2, U0 is a positive scaling variable, for example of 0.25 V, which is specifically selected such that the inequality $|(U1i - U2i)|/|U0| \leq 1$ is valid. In addition, k1 and k2 are two appropriately selected positive constants for the calculation of the performance factor Gi of each battery cell 21.

By the appropriate selection of the constants k1 and k2, the following is achieved:

Where no current I,–I is flowing in the battery cells 21 of the battery 111 according to the invention, for each battery cell 21, the product of the corresponding current value I and the internal resistance Ri of the corresponding battery cell 21 is equal to zero, i.e. for each battery cell 21, the variable $|(U1i - U2i)|$, which represents the magnitude of the difference between the corresponding first voltage Ui1 and the corresponding second voltage Ui2, is also equal to zero. As a result, the performance factor Gi of each battery cell 21 is only influenced by the state of charge LZi of the corresponding battery cell. If the current value I of the current I,-I flowing in the battery 111 of the battery system 100 according to the invention rises, the corresponding variable |(U1i-U2i)|also increases in proportion to the current value I of the current I,-I, and to the internal resistance Ri of the corresponding battery cell 21. As a current I,-I flowing in the battery 111 according to the invention has the same current value I for all the battery cells 21, this means that, in the presence of discharge currents I with high current values I, battery cells 21 with a higher internal resistance Ri will be assigned a lower performance factor Gi than battery cells 21 with a lower internal resistance Ri and, in the presence of charging currents -I with high current values I, battery cells 21 with a higher internal resistance Ri will be assigned a higher performance factor Gi than battery cells 21 with a lower internal resistance Ri.

Consequently, battery cells 21 with a higher internal resistance Ri, both in the presence of discharge currents I with high current values I and in the presence of charging currents -I with high current values I, will be connected less frequently and, accordingly, will be subject to reduced loading. As both discharge currents I and charging currents -I with high current values I accelerate the aging of each battery cell 21, and the internal resistance Ri of each battery cell 21 observes a proportional relationship to the state of health of the corresponding battery cell 21, the uniform aging of the battery cells 21 can be achieved on the basis of the performance factors Gi of the battery cells 21 calculated according to the invention.

As already mentioned, the central control unit 30 in the battery system 100 according to the invention is also designed to dictate the first control variable P1 and the second control variable P2, and to execute the transmission thereof to the battery cell monitoring modules 122 via the communication link 31.

In summary, each battery cell monitoring module 122 according to the invention is designed to apply, for its associated battery cell 21, the first control variable P1, scaled by the application of a corresponding first factor f1i, as the corresponding first probability P1i, and the second control variable P2, scaled by the application of a corresponding second factor f2i, as the corresponding second probability P2i. As only a single first control variable P1 and a single second control variable P2 are dictated by the central control unit for all the battery cells 21, both the first control variable P1 and the second control variable P2 are independent of the performance factor Gi of any given battery cell 21. Conversely, the first factor f1i and the second factor f2i are predefined respectively in accordance with the performance factor Gi of the associated battery cell 21 calculated according to the invention.

Consequently, each battery cell monitoring module 122 according to the invention is designed, for its associated battery cell 21, to determine a corresponding first probability P1i during the discharging of the battery (111), in accordance with equation (7), and during the charging of the battery (111), in accordance with equation (8), and to determine a corresponding second probability P2i during the discharging of the battery (111), in accordance with equation (9), and during the charging of the battery (111), in accordance with equation (10):

$$P1i = f1i \cdot P1 = Gi \cdot P1 \quad (7)$$

$$P1i = f1i \cdot P1 = (1-Gi) \cdot P1 \quad (8)$$

$$P2i = f2i \cdot P2 = (1-Gi) \cdot P2 \quad (9)$$

$$P2i = f2i \cdot P2 = Gi \cdot P2 \quad (10)$$

In equations 7 to 10, P1 is the first control variable, P2 is the second control variable, f1i is the corresponding first factor, and f2i is the corresponding second factor.

In addition to the written disclosure set out above, the invention is further disclosed with reference to the representation thereof in FIGS. 2 to 4.

The invention claimed is:

1. A method for the switching a plurality of battery cells (21) in a battery (111) which is configured as an electrochemical storage device,
electrically connecting, by a cell monitoring module (122), each of the plurality of battery cells (21) to the battery (111) based on a first probability P1i,
electrically disconnecting, by the cell monitoring module (122), each of the plurality of battery cells (21) from the battery (111) based on second probability P2i,
wherein the battery cells (21) are mutually connectable in series,
calculating, by the cell monitoring module (122), a performance factor Gi for each of the plurality of battery cells (21) as a sum of a function, which is linearly dependent upon a state of charge LZi of the corresponding battery cell, and a second function which is linearly dependent upon a product of a current value I of a current (I,-I) which flows in the corresponding battery cell (21) when the latter is electrically connected to the battery (111) and an internal resistance (Ri) of the corresponding battery cell (21) and,
determining, by the cell monitoring module (122), the corresponding first probability P1i and the corresponding second probability P2i for each of the plurality of battery cells (21) based on the calculated performance factor Gi.

2. The method according to claim 1, wherein the first probability P1i for each battery cell (21) during the discharging of the battery (111) is a uniformly rising linear function, and during the charging of the battery (111) a uniformly falling linear function of the performance factor Gi of the corresponding battery cell (21) and the second probability P2i for each battery cell (21) during the discharging of the battery (111) is a uniformly falling linear function, and during the charging of the battery (111) a uniformly rising linear function of the performance factor Gi of the corresponding battery cell (21), and the first function in the expression of the performance factor Gi for each battery cell (22), during both the discharging of the battery (111) and the charging of the battery (111), is a uniformly rising linear function of the state of charge LZi of the corresponding battery cell (21) and the second function in the expression of the performance factor Gi for each battery cell (21), during the discharging of the battery (111), is a uniformly falling linear function and, during the charging of the battery (111), a uniformly rising linear function of the product of the current value I of the current (I,-I) flowing in the corresponding battery cell (21), when the latter is electrically connected to the battery (111), and the internal resistance (Ri) of the corresponding battery cell (21).

3. The method according to claim 1, wherein, for the calculation of the performance factor Gi of each battery cell (21), the state of charge LZi of the corresponding battery cell (21), a first voltage (U1*i*) which is present on the corresponding battery cell (21) when the latter is connected to the battery (111), and a second voltage (U2*i*) which is present on the corresponding battery cell (21) when the latter is disconnected from the battery (111) are measured, and a value is determined for a difference between the corresponding first voltage (U1*i*) and the corresponding second voltage (U2*i*), which is identical to the product of the current value I of the current (I,−I), which flows in the corresponding battery cell (21) when the latter is connected to the battery (111), and the internal resistance (Ri) of the corresponding battery cell (21).

4. The method according to claim 1, wherein the performance factor Gi of each battery cell (21) during the discharging of the battery (111) is determined by the equation $$Gi = k1 \cdot LZi + k2 \cdot (1 - (|(U1i - U2i)|/|U0|))$$

and during the charging of the battery (111) is determined by the further equation $$Gi = k1 \cdot LZi + k2 \cdot ((|(U1i - U2i)|/|U0|))$$

wherein k1 + k2 = 1, k1 and k2 are positive constants, i is a natural number between 1 and n, where n represents the number of battery cells (21) in the battery (111), LZi is the state of charge of the corresponding $i^{th}$ battery cell (21), U1*i* is the first voltage, which is present on the corresponding $i^{th}$ battery cell (21) when the latter is connected to the battery (111), U2*i* is the second voltage, which is present on the corresponding $i^{th}$ battery cell (21) when the latter is disconnected from the battery (111), and U0 is a positive scaling variable, which is selected such that the inequality $|(U1i−U2i)|/|U0| \leq 1$ will be valid.

5. The method according to claim 4, wherein the positive scaling variable is 0.25 V.

6. The method according to claim 1, wherein for each battery cell (21), a first control variable P1 scaled by the application of a first factor f1*i* and a second control variable P2 scaled by the application of a second factor f2*i* are applied correspondingly as the first probability P1*i* and the second probability P2*i* respectively, wherein the first control variable P1 and the second control variable P2 respectively are independent of the performance factor Gi of the corresponding battery cell (21), and the first factor f1*i* and the second factor f2*i* respectively are predefined in accordance with the performance factor Gi of the corresponding battery cell (21).

7. The method according to claim 6, wherein the same first control variable P1 and the same second control variable P2 are applied for all the battery cells (21).

8. The method according to claim 7, wherein, for the generation of a desired output voltage Us from the battery (21), the first control variable P1 and the second control variable P2 are stipulated, and a current output voltage (U) of the battery (21) is measured and is compared with the desired output voltage Us of the battery (21) and, in the event of a difference between the current output voltage (U) and the desired output voltage Us, the first control variable P1 and the second control variable P2 are adjusted such that the magnitude of the difference between the current output voltage (U) and the desired output voltage Us is minimized.

* * * * *